US009083393B2

United States Patent
Kwun et al.

(10) Patent No.: US 9,083,393 B2
(45) Date of Patent: Jul. 14, 2015

(54) USER EQUIPMENT FOR SIMULTANEOUSLY TRANSMITTING SIGNALS TO WHICH DIFFERENT WIRELESS COMMUNICATION SYSTEMS ARE APPLIED THROUGH A PLURALITY OF FREQUENCY BANDS

(75) Inventors: Soonik Kwun, Seoul (KR); Hyunil Kim, Gwangmyeong-si (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 13/117,742

(22) Filed: May 27, 2011

(65) Prior Publication Data

US 2011/0292844 A1 Dec. 1, 2011

Related U.S. Application Data

(60) Provisional application No. 61/350,028, filed on Jun. 1, 2010.

(30) Foreign Application Priority Data

Dec. 6, 2010 (KR) .......................... 10-2010-0123362

(51) Int. Cl.
*H04B 1/00* (2006.01)
*H04B 1/10* (2006.01)
(Continued)

(52) U.S. Cl.
CPC ............... *H04B 1/0057* (2013.01); *H04B 1/10* (2013.01); *H04B 7/0828* (2013.01); *H04L 1/0631* (2013.01)

(58) Field of Classification Search
CPC ...... H04B 1/0057; H04B 1/10; H04B 7/0828; H04L 5/14; H04L 1/0631
USPC ................................................. 379/278, 355
See application file for complete search history.

(56) References Cited

U.S. PATENT DOCUMENTS 7,103,383 B2 * 9/2006 Ito ............................... 455/562.1
7,425,872 B2 * 9/2008 Inamori et al. ................ 330/295

(Continued)

FOREIGN PATENT DOCUMENTS

EP 0812069 A2 12/1997
EP 1164719 A1 12/2001

(Continued)

*Primary Examiner* — Alpus H Hsu
*Assistant Examiner* — Anthony Luo
(74) *Attorney, Agent, or Firm* — Birch, Stewart, Kolasch & Birch, LLP

(57) ABSTRACT

A user equipment (UE) including first and second antennas; a first wireless communication chip configured to output first and second signals corresponding to first and second frequency bands, respectively; a second wireless communication chip configured to output thirds signals corresponding to a third frequency band; and a radio frequency (RF) front-end module configured to transmit the first and second signals corresponding to the first and second frequency bands output from the first wireless communication chip to the first antenna, transmit the third signal corresponding to the third frequency band output from the second wireless communication chip to the first antenna, transmit the second signal corresponding to the second frequency band externally received in the first antenna to the first wireless communication chip through a secondary Rx path, transmit the second signal corresponding to the second frequency band externally received in the second antenna to the first wireless communication chip through a primary Rx path, and transmit the third signal corresponding to the third frequency band received in the first and second antennas to the second wireless communication chip.

17 Claims, 2 Drawing Sheets

(51) Int. Cl.
*H04L 1/06* (2006.01)
*H04B 7/08* (2006.01)

(56) References Cited

U.S. PATENT DOCUMENTS

| | | | |
|---|---|---|---|
| 7,643,848 B2* | 1/2010 | Robinett | 455/552.1 |
| 8,184,678 B2* | 5/2012 | McHenry | 375/219 |
| 8,208,956 B2 | 6/2012 | Kanou | |
| 8,311,509 B2* | 11/2012 | Feher | 455/404.2 |
| 2006/0128421 A1 | 6/2006 | van Rooyen | |
| 2007/0021080 A1 | 1/2007 | Kuriyama et al. | |
| 2007/0223615 A1* | 9/2007 | Dosanjh et al. | 375/267 |
| 2007/0237118 A1* | 10/2007 | Seo | 370/335 |
| 2009/0180403 A1* | 7/2009 | Tudosoiu | 370/278 |
| 2009/0285135 A1 | 11/2009 | Rousu et al. | |

FOREIGN PATENT DOCUMENTS

| | | |
|---|---|---|
| EP | 1427115 A1 | 6/2004 |
| JP | 2007-19939 A | 1/2007 |
| JP | 2007-228427 A | 9/2007 |
| JP | 2007-324711 A | 12/2007 |
| WO | WO 01/50636 A1 | 7/2001 |

* cited by examiner

USER EQUIPMENT FOR SIMULTANEOUSLY TRANSMITTING SIGNALS TO WHICH DIFFERENT WIRELESS COMMUNICATION SYSTEMS ARE APPLIED THROUGH A PLURALITY OF FREQUENCY BANDS

Pursuant to 35 U.S.C. §119(e), this application claims the benefit of priority to Provisional Application No. 61/350,028, filed on Jun. 1, 2010, the contents of which are incorporated by reference herein in their entirety. Pursuant to 35 U.S.C. §119(a), this application claims the benefit of priority to korean application No. 10-2010-0123362, filed on Dec. 6, 2010, the contents of which are incorporated by reference herein in their entirety.

BACKGROUND OF THE INVENTION

1. Field of the Invention

The present invention relates to a user equipment, for transmitting signals through a plurality of frequency bands.

2. Discussion of the Related Art

In a wireless communication system according to the related art, a user equipment (UE) could not simultaneously transmit signals of dual bands through a licensed band. However, with the development of the wireless communication technology and the increase of demand on a radio wave, it is required that a voice service and a data service should be used through a licensed band.

Accordingly, a user equipment that supports dual bands needs to simultaneously transmit a voice service and a data service through the dual bands. In this case, since two antennas are designed for transmission and reception, respectively, in accordance with the related art, a problem occurs in that intermodulation distortion (IMD) occurs at the RF front end. For this reason, a problem occurs in that the reception sensitivity of the user equipment at a specific band is significantly deteriorated.

However, a solution for the problem has not been suggested until now.

SUMMARY OF THE INVENTION

Accordingly, the present invention is directed to a user equipment for transmitting signals through a plurality of frequency bands, which substantially obviates one or more problems due to limitations and disadvantages of the related art.

An object of the present invention is to provide a user equipment (UE) for transmitting signals, to which different wireless communication systems are applied, through a plurality of frequency bands.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a user equipment according to the present invention comprises first and second antennas; a first wireless communication chip configured to output first and second signals corresponding to first and second frequency bands, respectively; a second wireless communication chip configured to output thirds signals corresponding to a third frequency band; and a radio frequency (RF) front-end module configured to: transmit the first and second signals corresponding to the first and second frequency bands output from the first wireless communication chip to the first antenna, transmit the third signal corresponding to the third frequency band output from the second wireless communication chip to the first antenna, transmit the second signal corresponding to the second frequency band externally received in the first antenna to the first wireless communication chip through a secondary Rx path, transmit the second signal corresponding to the second frequency band externally received in the second antenna to the first wireless communication chip through a primary Rx path, and transmit the third signal corresponding to the third frequency band received in the first and second antennas to the second wireless communication chip.

The first wireless communication chip is configured to use a first wireless communication scheme, and the second wireless communication chip is configured to use a second wireless communication scheme that is different than the first wireless communication scheme. The second wireless communication scheme is a 3rd generation partnership project long term evolution (3GPP LTE) wireless communication scheme. The first wireless communication scheme is a Code Division Multiple Access (CDMA) wireless communication scheme.

The RF front-end module includes a first duplexer configured to duplex the first signal output by the first wireless communication chip and the first signal received by the first antenna, the RF front-end module further includes a second duplexer configured to duplex the second signal output by the first wireless communication chip and the second signal received by the first antenna.

The RF front-end module further includes a third duplexer configured to duplex the third signal output by the second wireless communication chip and the third signal received by the first antenna. The RF front-end module further includes a first power amplifier disposed between the first wireless communication chip and the first duplexer and configured to amplify the first signal output by the first wireless communication chip. The RF front-end module further includes a second power amplifier disposed between the first wireless communication chip and the second duplexer and configured to amplify the second signal output by the first wireless communication chip.

The RF front-end module includes a diplexer configured to perform band splitting for the second signal output from the first wireless communication chip and the third signal output from the second wireless communication chip and to transmit the band split second and third signals to the first antenna. The RF front-end module further includes a third power amplifier disposed between the second wireless communication chip and the diplexer and configured to amplify the third signal output by the second wireless communication chip.

The first and second wireless communication chips are separate chips. The first signal output from the first wireless communication chip is a voice service signal, and the third signal output from the second wireless communication chip is a data service signal. The first antenna is a primary antenna. The second antenna is a secondary antenna.

The RF front-end module further includes a duplexer configured to duplex the second signal output by the first wireless communication chip and the second signal received by the first antenna and a band rejection filter disposed between the duplexer and the first antenna and configured to prevent IM3 from affecting the second signal received by the first antenna. The RF front-end module further includes a matching circuit disposed between the band rejection filter and the first antenna and configure to match an impedance between the first antenna and the first wireless communication chip. The RF front-end module further includes a diplexer connected to the first and second wireless communication chips and the second antenna and configured to diplex the first, second and third signals received by the second antenna, and to output the diplexed first and second signals to the first wireless communication chip and the third signal to the second wireless communication chip.

According to the embodiments of the present invention, the user equipment satisfies SAR condition when simultaneously transmitting signals, to which different wireless communication schemes are applied, through a plurality of frequency bands, and removes the influence of IM3, whereby communication throughput can be improved.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
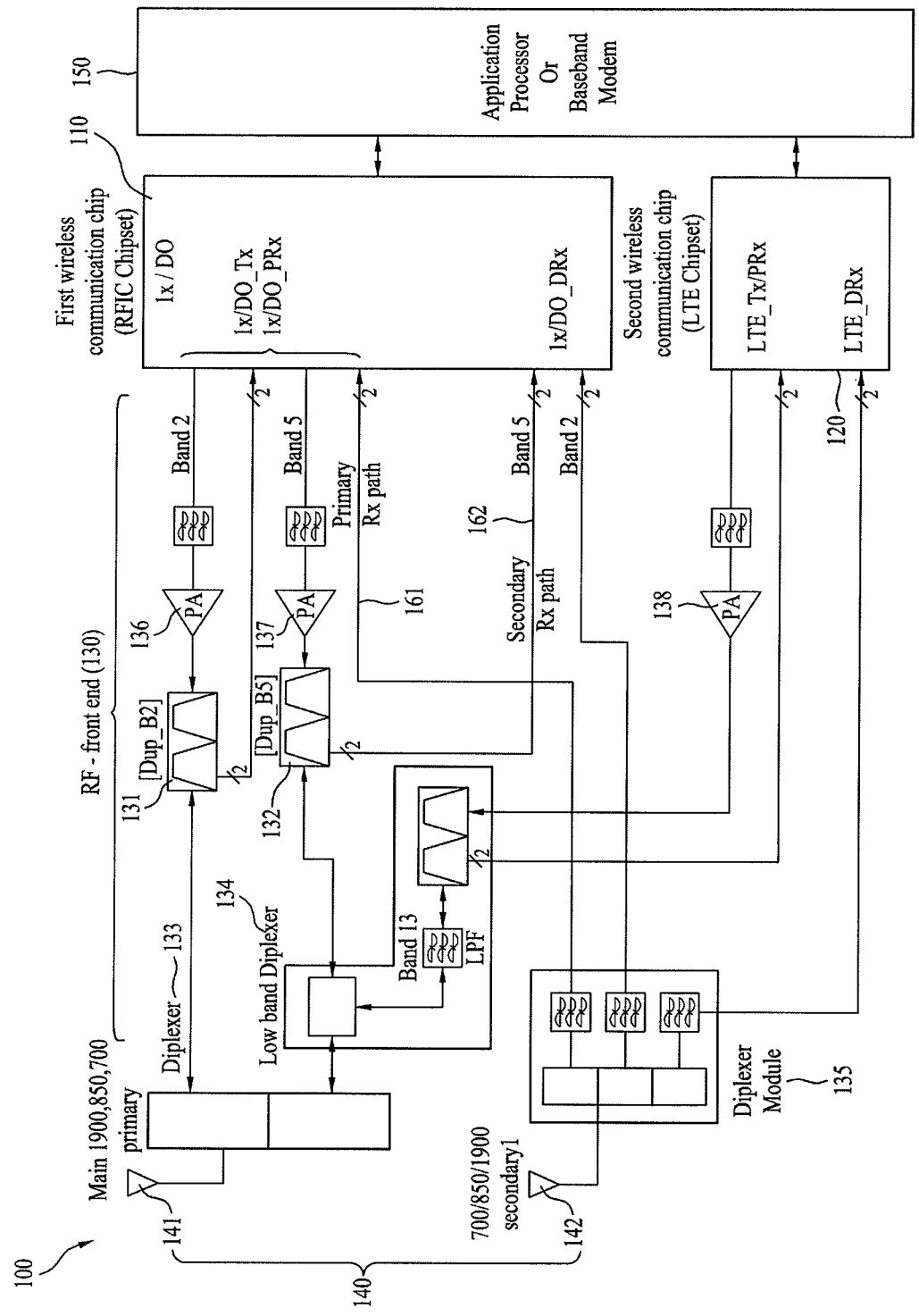
FIG. 1 is a diagram illustrating an example of a configuration of a user equipment 100 according to the first embodiment of the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide a full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the description of the present invention, a user equipment (UE) designates a mobile or fixed type communication device used by a user, such as a mobile station (MS), an advanced mobile station (AMS), mobile terminal and a mobile handset. Also, a base station (BS) designates a random node that performs communication with the user equipment, and its examples include Node B, eNode B, and an access point (AP).

In the present invention, "wireless communication scheme" may be referred to as various terminologies such as a radio access technology (RAT) scheme. Examples of the wireless communication scheme or radio access technology scheme include a code division multiple access (CDMA) scheme, a wideband code division multiple access (WCDMA) scheme and a long term evolution (LTE) scheme.

In the wireless communication system, the user equipment can receive a signal through a downlink, and can transmit a signal through an uplink. Examples of information transmitted from or received in the user equipment include data and various kinds of control information. Various physical channels are provided depending on types and purpose of use of the information transmitted from or received in the user equipment.

In this specification, a first wireless communication chip and a second wireless communication chip is to transmit signals to which different wireless communication schemes or different radio access technology schemes are applied. For example, the first wireless communication chip is based on, but not limited to, CDMA200 1xDO scheme while the second wireless communication chip is based on, but not limited to, the LTE scheme.

Hereinafter, various embodiments describing an RF front end configured to enable simultaneous transmission of signals to one antenna through a plurality of frequency bands (for example, the frequency bands are based on, but not limited to, dual bands).

The user equipment preferably follows a specific absorption rate (SAR) rule that quantitatively represents the influence of an electromagnetic wave on a human body. With breakthrough of the wireless communication technology, demand on the electric wave increases, and the electric wave is widely used in the field of medical service and traffic, and daily life as well as the field of communication and broadcasting. With the increase of electric devices, the electromagnetic wave radiated from electric wave facilities and devices has greatly affected the human body. In particular, the US federal communication commission (FCC) has adopted guidelines on an environmental impact assessment of radio frequency radiation of FCC 96-326 to prescribe a limit of local power absorption, which will be applied to a random portable transmitting device.

The limit of maximum allowable exposure prescribed in the guidelines is based on an exposure assessment criterion quantified by a specific absorption rate (SAR) rule that is the standard of a radio frequency (RF) energy absorption rate. If an electromagnetic wave is going to be radiated towards the human body, a quantitative assessment on the electromagnetic wave is performed by a SAR measurement through an animal test, and through power measurement and analysis of electromagnetic fields. Further, the SAR is represented by an absorption power per unit mass, which is absorbed in the human body by exposure of the human body to the electromagnetic fields.

In addition to the US FCC, CENELEC of the Europe has prescribed the SAR condition as requirements of conformity assessment of a mobile communication terminal. Although there is the difference in reference values of the electromagnetic wave SAR rule, the US FCC and the European CENELEC prescribe the SAR condition as an important guideline of conformity assessment of the mobile communication terminal. Accordingly, the mobile communication terminal preferably satisfied the SAR condition (or rule).

The most general method for satisfying the SAR value is that the mobile communication terminal is located far away from the human body, if possible. If signals should be transmitted simultaneously through a plurality of frequency bands as suggested in an embodiment of the present invention, two antennas are preferably used. In this instance, the SAR value may not satisfy the prescribed value due to a restriction of the location of the antennas.

Accordingly, if the antennas are located at a place the farthest away from the human body and the RF front end is designed to simultaneously transmit signals to one antenna through a plurality of frequency bands, the most optimized SAR value can be obtained. Hereinafter, a solution for satisfying the SAR condition and solving the problem of intermodulation distortion (IMD) will be described. In this specification, a band 2, a band 5 and a band 13 correspond to different frequency bands.

First Embodiment

FIG. 1 is a diagram illustrating an example of a configuration of a user equipment 100 according to the first embodiment of the present invention. As shown in FIG. 1, the user equipment 100 includes a first wireless communication chip 110, a second wireless communication chip 120, an RF front-end module 130, an antenna 140, and an application processor or baseband modem 150.

In the embodiment in FIG. 1, the RF front-end module 130 includes duplexers 131 and 132, diplexers 133, 134 and 135, and power amplifiers 136, 137 and 138. The antenna 140 also includes a primary antenna 141 and one or more secondary antennas 142.

Further, a radio wave of a specific frequency band is used for wireless communication. The first and second wireless communication chips 110 and 120 modulate original signals (baseband signals) to high frequency band signals during signal transmission, and demodulate the received high frequency band signals to the baseband signals during signal reception. Each of the wireless communication chips 110 and 120 may be implemented as a "radio frequency (RF) chip" that modulates a signal processed at a baseband to a high frequency band signal, or may be implemented as an "RF and baseband chip" where a baseband chip that processes a baseband signal is combined with an RF chip that modulates a signal processed at a baseband to a high frequency band signal or demodulates the received signal to a low frequency band signal during signal transmission and reception to and from the baseband chip to process the modulated signal or the demodulated signal to the baseband signal.

As illustrated in FIG. 1, the user equipment 100 according to an embodiment of the present invention is implemented in such a manner that the first wireless communication chip 110 and the second wireless communication chip 120 are provided separately from the application processor or the baseband modem 150.

Also, although the first and second wireless communication chips 110 and 120 may be provided as separate chips as illustrated in FIG. 1, they may be provided as one chip.

As described above, the first wireless communication chip 110 and the second wireless communication chip 120 process the original signal to the high frequency band signal during signal transmission, whereas they process the high frequency band signal to the baseband signal. Also, the first wireless communication chip 110 and the second wireless communication chip 120 perform modulation/demodulation functions, respectively.

If the user equipment (UE) 100 needs to simultaneously transmit signals through the wireless communication chips 110 and 120 to which different wireless communication schemes are applied, the first wireless communication chip 110 processes the original signal to the first frequency band signal, and at the same time the second wireless communication chip 120 processes the original signal to the second frequency band signal. In other words, the user equipment 100 can transmit the signals by modulating the signals to different frequency band signals through the first and second wireless communication chips 110 and 120 during signal transmission. In general, when simultaneously transmitting the signals processed by the first and second wireless communication chips 110 and 120, the user equipment 100 can transmit the signals through different frequency bands.

Further, the RF front-end module 130 can serve to freely perform signal transmission and reception of the user equipment 100 and enable communication under various environments. The RF front-end module 130 can split transmitting and receiving signals from each other by connecting the antenna 140, the first wireless communication chip 110 and the second wireless communication chip 120 with one another.

The RF front-end module 130 may also include a receiver front-end module having a receiving signal filter for filtering and amplification, and a transmitter front-end module having a power amplifier amplifying a transmitting signal. The RF front-end module 130 can mainly be used for a TDMA type global system for mobile communications (GSM) user equipment that requires switching between a transmitting signal and a receiving signal during communication.

Also, the RF front-end module 130 can transmit a signal through multiple frequency bands in the same manner as the user equipment described in the present invention. For example, the RF front-end module 130 allows the user equipment 100 to simultaneously use the CDMA2000 1xD0 scheme and the LTE scheme. If the RF front-end module 130 is used, the number of parts of the user equipment 100 can be reduced, reliability of the user equipment 100 can be improved, and loss caused by interconnection between the parts can be reduced.

Also, the RF front-end module 130 remarkably reduces battery consumption by reducing power consumption, and enables miniaturization of the parts of the multi-functional user equipment of multiple frequency bands.

Hereinafter, a method of configuring the RF front-end module 130 to allow the user equipment 100 to enable simultaneous signal transmission to one antenna through a plurality of frequency bands and a method of avoiding IMD (or IM3) occurring during simultaneous signal transmission to one antenna through a plurality of frequency bands will be described.

InterModulation distortion (IMD) is caused by intermodulation of a signal at an output end when two or more frequencies pass through a non-linear system or circuit. Namely, IMD means distortion due to intermodulation (IM) components. Unlike an analog system, in a digital system such as the CDMA system, instead of using one frequency, i.e., one channel used by one signal, a wide channel bandwidth is shared by several signals. For this reason, IMD is important. In other words, since signals of several frequencies are simultaneously input to a system that processes one band, the signals of several frequencies are mixed at the output end, whereby signal processing may not be performed normally.

For example, supposing that two frequencies of f1 and f2 are provided, signals of several IM components are output but full multiple harmonics such as $2*f1$ and $3*f2$ can be filtered by the filter. However, third orders, such as $2*f1*f2$ and $2*f2*f1$, which correspond to signals closest to the signals f1 and f2, may cause a problem. IMD is mainly caused by these third order IM components. Accordingly, signals called IMD generally mean third order IMD. Since a third frequency component of IM, which is also expressed as IMD, should generally be removed, IM may be referred to as IM3.

In particular, third order IMD equationally increases to cube in accordance with the increase of input signals. Accordingly, although IMD first occurs at a small range, as the input signals are increased at a gradient faster than that of the original signal, IMD may occur similarly to power of the original signal. When IMD is similar to the power of the original signal, it may be referred to IP3.

As described above, IMD means a level of signal distortion due to intermodulation, and IP3 is used as option or measurement reference value of a real product. In a super heterodyne based on intermediate frequency (IF), since the third order of intermodulation is closest to the original signal, the third IM should be removed. Accordingly, it is preferable that signal distortion such as IMD and interference are reduced.

In order to reduce IM3, the RF front-end module 130 according to an embodiment of the present invention transmits signals of a plurality of frequency bands (for example, band 2 and band 5), which are output from the first wireless communication chip 110 and a signal (corresponding to band 13) output from the second wireless communication chip 120 to the primary antenna 141.

Also, the RF front-end module 130 transmits the signal corresponding to a specific band (for example, band 5) among the signals of the plurality of frequency bands (i.e., band 2 and band 5) externally received in the primary antenna 141 to the first wireless communication chip 110 through a secondary Rx path 162, and transmits the signal corresponding to the specific band (for example, band 5) among the signals externally received in the secondary antenna 142 to the first wireless communication chip 110 through the primary Rx path 161. The RF front-end module 130 receives the signal corresponding to the band 2 from the primary antenna 141 and the secondary antenna 142, respectively, and then delivers the signal to the first wireless communication chip 110.

Also, the RF front-end module 130 transmits the signal (i.e., the signal corresponding to band 13) of the band corresponding to the second wireless communication chip 120 among the signals respectively received in the primary antenna 141 and the secondary antenna 142 to the second wireless communication chip 120.

In this case, the primary Rx path 161 of the RF front-end module 130 may be referred to as a primary path that forwards the signal (or data) externally received in the antenna 140 to the first wireless communication chip 110, and the secondary Rx path 162 may be referred to as a secondary path that forwards the signal (or data) externally received in the antenna 140 to the first wireless communication chip 110 so as to obtain diversity gain.

As described above, the RF front-end module 130 transmits the signal of the specific frequency band (for example, band 5), which is output from the first wireless communication chip 110, to the primary antenna 141. If the primary antenna 141 externally receives the signal corresponding to the specific frequency band (for example, band 5), it forwards the received signal to the first wireless communication chip 110 through the secondary Rx path 162. If the secondary antenna 142 externally receives the signal corresponding to the specific frequency band (for example, band 5), it forwards the received signal to the first wireless communication chip 110 through the primary Rx path 161.

Further, the duplexer is a device to protect the receiver from the transmitted output during transmission to use one antenna in common for transmission and reception, and to supply an echo signal to the receiver during reception. The duplexer 131 duplexes the signal of the specific band (for example, band 2), which is output from the first wireless communication chip 110 and the received signal corresponding to the specific band (for example, band 2), which is received from the primary antenna 141. The duplexer 132 duplexes the signal of the specific band (for example, band 5) output from the first wireless communication chip 110 and the received signal corresponding to the specific band (for example, band 5), which is received from the primary antenna 141. Duplexer within diplexer 134 may duplex signal output by the second wireless communication chip 120 and signal received by the primary antenna 141.

The diplexer is a device that forwards signals separately output from two circuits to one circuit without mutual interference. The diplexer means a divergence filter device used to simultaneously transmit and receive two signals of which frequencies are different from each other. Since it is sufficient that bands of the two signals of which frequencies are different from each other are only split from each other, the diplexer has a simple structure where a low pass filter (LPF) that passes a low frequency signal and a high pass filter (HPF) that passes a high frequency signal are combined with each other.

The diplexer 134 performs band splitting for the signal of the band corresponding to band 5, which is output from the first wireless communication chip 110 and the signal of the band corresponding to band 13, which is output from the second wireless communication chip 120, and then forwards the split signals to the primary antenna 141.

In addition, the diplexer 135 performs band splitting for the signals (for example, signals corresponding to band 2, band 5 and band 13) externally received in the secondary antenna 142. In this way, the signals (for example, signals corresponding to band 2, band 5 and band 13) externally received in the secondary antenna 142 are subjected to band splitting by the diplexer 135, whereby the signal corresponding to band 2 is forwarded to the first wireless communication chip 110, the signal corresponding to band 5 is forwarded to the first wireless communication chip 110 through the primary Rx path 161, and the signal corresponding to band 13 is forwarded to the second wireless communication chip 120.

The power amplifiers 136, 137 and 138 serve to amplify the signal of the band corresponding to band 2, which is output from the first wireless communication chip 110, the signal of the band corresponding to band 5, which is output from the first wireless communication chip 110, and the signal of the band corresponding to band 13, which is output from the second wireless communication chip 120, respectively.

If the RF front-end module 130 transmits the signal of the band (especially, band 5) where IM3 occurs, through the primary antenna 141, and receives the signal through the secondary antenna 142 and not through the primary antenna 141, IM3 can be reduced as much as coupling loss between the two antennas 141 and 142.

Second Embodiment

The second embodiment according to the present invention discloses a method of inserting a filter having high IP3 to a front end of a duplexer of an RF path to prevent IM3 from affecting a received signal, in which the IM3 occurs at an RF end due to inter modulation. In this instance, IM3 can be prevented from affecting a received signal by rejecting a transmitting signal, which directly affects IM3 occurring in a receiving path, to reach a specific level (i.e., level that does not affect the receiver) or less.

Figure 2:
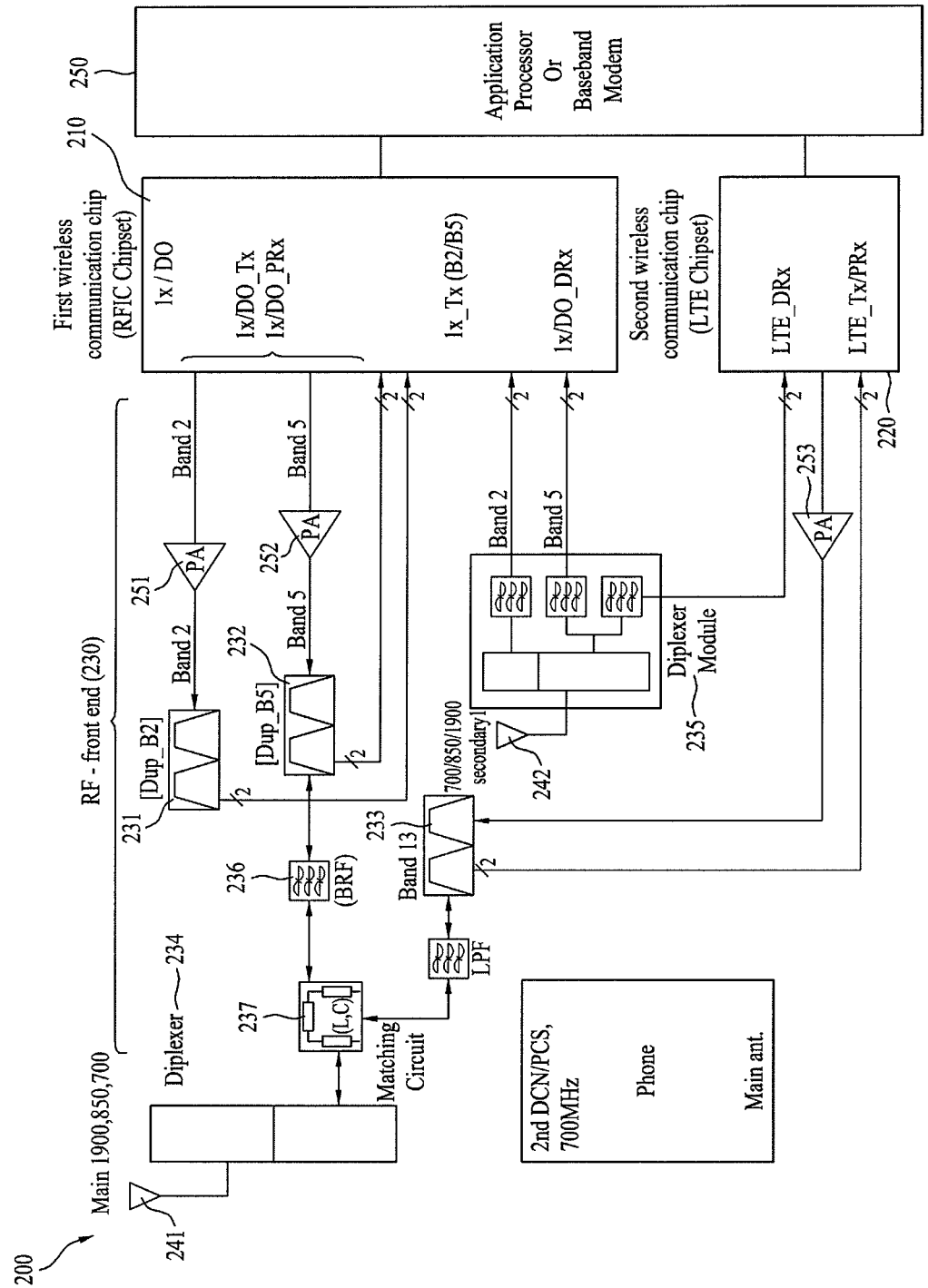
FIG. 2 is a diagram illustrating an example of a configuration of a user equipment 200 according to the second embodiment of the present invention.

In particular, FIG. 2 is a diagram illustrating an example of a configuration of a user equipment 200 according to the second embodiment of the present invention. As shown in FIG. 2, the user equipment 200 includes a first wireless communication chip 210, a second wireless communication chip 220, an RF front-end module 230, a primary antenna 241, a secondary antenna 242, and an application processor or baseband modem 250.

The RF front-end module 230 also includes duplexers 231, 232 and 233, diplexers 234 and 235, band rejection filter (BRF) 236, a matching circuit module 237, and power amplifiers 251, 252 and 253.

The RF front-end module 230 according to this embodiment transmits signals of a plurality of frequency bands (for example, band 2 and band 5), which are output from the first wireless communication chip 210 and a signal (corresponding to band 13) output from the second wireless communication chip 220 to the primary antenna 241.

In more detail, the signals of the plurality of frequency bands (for example, band 2 and band 5), which are output from the first wireless communication chip 210 are respectively amplified by the power amplifiers 251 and 252, and the signal corresponding to the amplified band 2 and the signal corresponding to the amplified band 5 are transmitted to the primary antenna 241 through the matching circuit module 237 after the signal corresponding to the amplified band 2 passes through the duplexer 231 and the signal corresponding to the amplified band 5 passes through the duplexer 232. The signal corresponding to a specific frequency band (for example, band 13), which is output from the second wireless communication chip 220, is amplified through the power amplifier 239, processed through the duplexer 233 and the matching circuit module 237 and then transmitted to the primary antenna 241.

Since transmission characteristics due to impedance are greatly varied in the RF front-end module 230 if frequency becomes higher, it is preferable that impedance occurs uniformly at connection ends. However, because a characteristic impedance of 50Ω may not occur at respective ends in an actual design, impedance matching is used. The matching circuit module 237 serves to perform impedance matching. At this time, the Smith chart is used for normal impedance matching.

Further, the band rejection filter (BRF) 236 is located at a front end of the duplexers 231 and 232 in the RF Rx path and has a high IP3. The band rejection filter (BRF) 236 can reduce an influence of IM3 on the receiver by rejecting a transmitting signal, which directly affects IM3 occurring in the RF Rx path, to reach a specific level or less.

The RF front-end module 230 forwards the signals corresponding to specific frequency bands (for example, band 2 and band 5), which are externally received in the primary antenna 241, to the first wireless communication chip 210 through the duplexers 231 and 232, respectively. Also, the RF front-end module 230 forwards the signals corresponding to a specific frequency band (for example, band 13), which are externally received in the primary antenna 241, to the second wireless communication chip 220 through the duplexer 233.

In addition, the RF front-end module 230 forwards the signals corresponding to specific frequency bands (for example, band 2 and band 5), which are externally received in the secondary antenna 242, to the first wireless communication chip 210 through the diplexer 235. Further, the RF front-end module 230 forwards the signals corresponding to a specific frequency band (for example, band 13), which are externally received in the secondary antenna 242, to the second wireless communication chip 220 through the diplexer 235.

According to the aforementioned embodiments of the present invention, since transmission is performed through only one antenna, SAR can be reduced even if simultaneous signal transmission is performed through the plurality of frequency bands. Also, the influence of IM3 occurring due to simultaneous signal transmission through the plurality of frequency bands can be minimized. Moreover, it is possible to improve RF throughput while reducing complexity of the RF front-end.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features.

Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various ways, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:
1. A user equipment (UE), comprising:
a first antenna configured to both receive and transmit a first signal corresponding to a first frequency band, a second signal corresponding to a second frequency band and a third signal corresponding to a third frequency band;
a second antenna configured to receive the first signal, the second signal and the third signal;
a first wireless communication chip comprising a first Tx port for transmitting both the first and the second signal, a first primary Rx port for receiving the first signal and the second signal, and a first diversity Rx port for receiving the second signal;

a second wireless communication chip comprising a second Tx port for transmitting the third signal, a second Primary Rx port for receiving the third signal and a second diversity Rx port for receiving the third signal; and a radio frequency (RF) front-end module configured to:

transmit the first and second signals output from the first wireless communication chip to the first antenna, transmit the third signal output from the second wireless communication chip to the first antenna, transmit the first and second signal externally received in the first antenna to the first wireless communication chip, transmit the first and second signal externally received in the second antenna to the first wireless communication chip, and transmit the third signal received in the first and second antennas to the second wireless communication chip, wherein all the signals received via the first antenna other than the second signal are transmitted to the primary Rx ports of the first and second communication chips whereas the second signal received via the first antenna is transmitted to the diversity Rx port of the first communication chip, wherein all the signals received via the second antenna other than the second signal are transmitted to the diversity Rx ports of the first and second communication chips whereas the second signal received via the second antenna is transmitted to the primary RX port of the first communication chip, and wherein the first wireless communication chip is configured to use a first wireless communication scheme, and the second wireless communication chip is configured to use a second wireless communication scheme that is different than the first wireless communication scheme.

2. The UE of claim 1, wherein the second wireless communication scheme is a 3rd generation partnership project long term evolution (3GPP LTE) wireless communication scheme.

3. The UE of claim 2, wherein the first wireless communication scheme is a Code Division Multiple Access (CDMA) wireless communication scheme.

4. The UE of claim 1, wherein the RF front-end module includes a first duplexer configured to duplex the first signal output by the first wireless communication chip and the first signal received by the first antenna, and to feed the duplexed first signal to the first wireless communication chip.

5. The UE of claim 4, wherein the RF front-end module further includes a second duplexer configured to duplex the second signal output by the first wireless communication chip and the second signal received by the first antenna, and to feed the duplexed second signal to the first wireless communication chip.

6. The UE of claim 5, wherein the RF front-end module further includes a third duplexer configured to duplex the third signal output by the second wireless communication chip and the third signal received by the first antenna, and to feed the duplexed third signal to the second wireless communication chip.

7. The UE of claim 6, wherein the RF front-end module further includes a first power amplifier disposed between the first wireless communication chip and the first duplexer and configured to amplify the first signal output by the first wireless communication chip.

8. The UE of claim 7, wherein the RF front-end module further includes a second power amplifier disposed between the first wireless communication chip and the second duplexer and configured to amplify the second signal output by the first wireless communication chip.

9. The UE of claim 8, wherein the RF front-end module includes a diplexer configured to perform band splitting for the second signal output from the first wireless communication chip and the third signal output from the second wireless communication chip and to transmit the band split second and third signals to the first antenna.

10. The UE of claim 9, wherein the RF front-end module further includes a third power amplifier disposed between the second wireless communication chip and the diplexer and configured to amplify the third signal output by the second wireless communication chip.

11. The UE of claim 1, wherein the first and second wireless communication chips are separate chips.

12. The UE of claim 1, wherein the first signal output from the first wireless communication chip is a voice service signal, and the third signal output from the second wireless communication chip is a data service signal.

13. The UE of claim 1, wherein the first antenna is a primary antenna and the second antenna is a secondary antenna.

14. The UE of claim 1, wherein the RF front-end module further includes:

a duplexer configured to duplex the second signal output by the first wireless communication chip and the second signal received by the first antenna, and to feed the duplexed second signal to the first wireless communication chip; and a band rejection filter disposed between the duplexer and the first antenna and configured to prevent IM3 from affecting the second signal received by the first antenna.

15. The UE of claim 14, wherein the RF front-end module further includes a matching circuit disposed between the band rejection filter and the first antenna and configured to match an impedance between the first antenna and the first wireless communication chip.

16. The UE of claim 14, wherein the RF front-end module further includes a diplexer module connected to the first and second wireless communication chips and the second antenna and configured to diplex the first, second and third signals received by the second antenna, and to output the diplexed first and second signals to the first wireless communication chip and the third signal to the second wireless communication chip.

17. The UE of claim 14, wherein a IP3 ($3^{rd}$ Order Intercept Point) of the band rejection filter is higher than a predetermined level.

* * * * *